INVENTORS.
Henry J. Hersey, Jr.
David B. Perlis.
BY
James D. Bock.
ATTORNEYS.

June 18, 1957  H. J. HERSEY, JR., ET AL  2,796,146
SCANNING JET FOR FILTERS
Filed Nov. 13, 1952  3 Sheets-Sheet 2
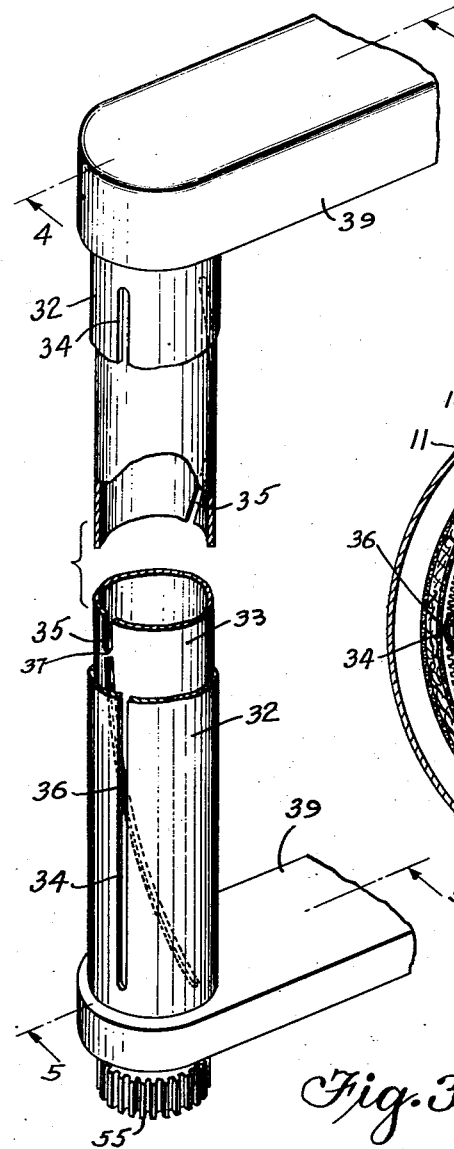
Fig. 3.
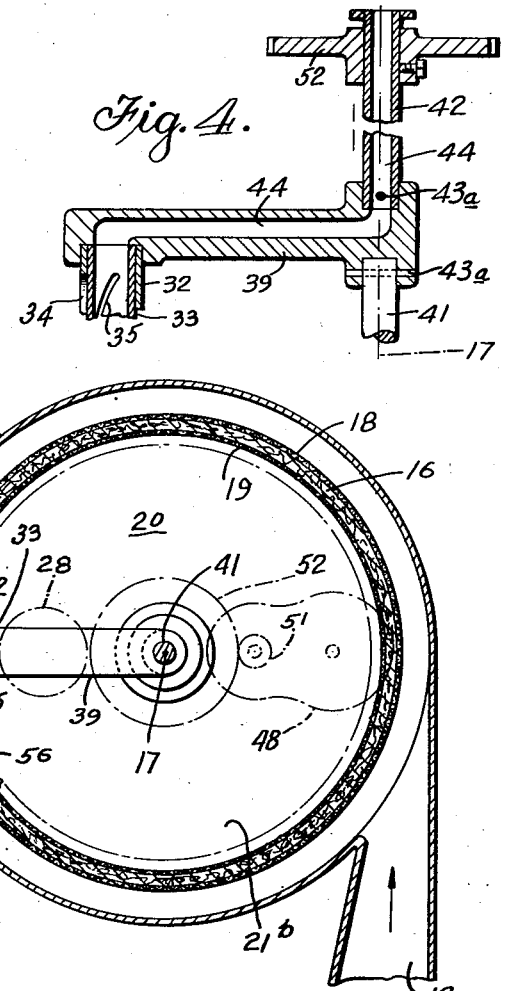
Fig. 4.
Fig. 2.
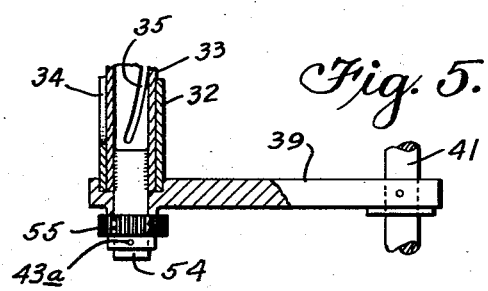
Fig. 5.
INVENTORS.
Henry J. Hersey, Jr.
David B. Perlis.
BY
James D. Bock
ATTORNEYS.

June 18, 1957   H. J. HERSEY, JR., ET AL   2,796,146
SCANNING JET FOR FILTERS

Filed Nov. 13, 1952   3 Sheets-Sheet 3

INVENTORS.
Henry J. Hersey, Jr.
David B. Perlis.
BY
James D. Bock
ATTORNEYS.

United States Patent Office 2,796,146
Patented June 18, 1957

2,796,146
SCANNING JET FOR FILTERS

Henry J. Hersey, Jr., Chatham, N. J., and David B. Perlis, North Hollywood, Calif.; said Perlis assignor to said Hersey Application November 13, 1952, Serial No. 320,254

1 Claim. (Cl. 183—61)

The present invention relates generally to the art of filters used for removing suspended particles from a stream of fluid, and more particularly to means for cleaning the filter medium of accumulated particles while maintaining a continuous flow through the filter. Because the present invention has been developed and particularly used for a filter medium collecting dry solids suspended in a gas stream, it is shown and described in this connection; but the invention is not necessarily limited by any specific kind of suspended particle. In its broad aspect, the invention is capable of use in various types and kinds of filters with different kinds of filter elements and with various fluids, both gases and liquids, carrying suspended particles which are removed from the fluid stream by the filter.

A typical filter is one used for removing solid particles suspended in a stream of gas, typically air. The filter medium is a fluid-pervious body of felt, Fiberglas, or other fibrous material having interstices small enough to retain the small solid particles carried by the gas stream. Flow through the filter medium is unidirectional and is induced by virtue of the difference in fluid pressure existing in the gas stream at the two sides of the filter, the upstream side of the filter being under higher pressure. As the filter continues in operation the solid particles, sometimes referred to herein as dust, collect on the upstream side of the filter. Usually the particles do not penetrate into the body of the filter medium for any considerable distance but rather tend to form a layer over the surface of the filter. Obviously, the capacity of the filter is reduced as the thickness and density of this layer increases and it therefore becomes necessary to clean the filter by removing this layer of accumulated dust.

Filters of this type are generally cleaned by stopping the flow of gas through the filter and then shaking or vibrating the filter medium in order to dislodge the accumulated dust particles, which then fall off the filter medium. Recently, various arrangements have been devised for cleaning the filter medium without interrupting the flow of fluid through the medium, thus maintaining the filter in full effective operation continuously. Generally speaking, these arrangements involve means for reversing the direction of pressure drop or differential across the filter medium. In some cases this is merely sufficient to eliminate any tendency to retain the accumulated particles on the filter medium by virtue of the differential in fluid pressure, while in other instances the pressure differential is intensified over a small area to the point that a stream of air or other gas flows in a reverse direction through the filter medium for the purpose of dislodging the accumulated solids and throwing them off the filter medium. An example of this latter type of apparatus is disclosed in Patent No. 2,495,635, issued January 24, 1950, to H. J. Hersey, Jr. on "Dust Filter."

A typical filter cleaning apparatus of the reverse flow type as disclosed in said patent includes a simple member forming an elongated narrow slot open over its entire area and through which a stream of air or other gas issues against the downstream side of the filter medium to pass through the filter medium. The length of this slot is equal to one dimension of the filter medium, for example the circumference of a cylindrical filter medium or the width of a flat, rectangular filter medium. The member defining the slot is then moved in the direction of the other dimension of the filter medium in order to cover the entire area of the filter medium. The slotted member is outwardly convex and bears against the filter element, preferably deforming the filter element slightly in order to bring it into contact with this member at both sides of the slot through which the cleaning air flows. This contact of the member and the filter element acts as a seal against escape of air and permits the stream of cleaning air to be maintained under a relatively low pressure.

When using filters of this type with hot gases, it is necessary to resort to materials for the filter medium which are able to resist the heat and corrosion encountered at elevated temperatures. Filter elements can be made of fibers of spun glass or mineral material such as are commonly used for heat insulation. These substances have the necessary degree of inertness but they are unsatisfactory in a reverse flow filter because the fibers are brittle and break easily. When a slotted member travels in contact with such a filter medium which is thereby deformed slightly as described, the filter medium deteriorates rapidly because the fibers break up under the constant flexing caused by repeated passage of the slotted member over the filter element. This wear of the filter element can be avoided by backing off the slotted member to the point where it just skims the surface of the filter medium, or is slightly spaced from it; but when this change is made, the operation of the cleaning jet is substantially changed. When in contact with the filter medium, the filter medium seals off the slot and the jet can operate at a comparatively low pressure which is just enough above the pressure of the fluid stream being filtered to cause the cleaning gas to penetrate the filter medium. When the slot is spaced from the filter medium, there is no seal and it is necessary that the jet issue from the slot at a comparatively high velocity in order that it reaches and penetrates the filter medium; and this in turn requires that the cleaning air be maintained under comparatively high pressure.

The size and cost of a blower unit for supplying the cleaning air increases very rapidly with any increase in pressure and volume of the cleaning air stream. With a slot of the character described extending across one dimension of a filter medium of commercial dimensions, it has been found that the size of blower required to deliver air at the necessary velocity when the slot is spaced from the filter medium is entirely out of proportion to the cost of the rest of the filter. The cost of the entire unit becomes excessive. The length of a slot of this character may be several feet; and since there are limits upon the amount by which the narrow dimension of the slot may be reduced it is still unavoidable that a slot of this character has a comparatively large orifice area. This area is large enough to pass such a large volume of air at effective pressures as to make a slotted cleaning element too costly to operate, except when the slot is sealed by contact with the filter medium.

It is therefore a general object of our invention to provide a reverse jet cleaning mechanism for a filter medium in which a high pressure, high velocity cleaning jet of gas may be maintained with a relatively small blower and motor unit, thus reducing the cost of this part of the apparatus to within acceptable limits.

It is also an object of our invention to devise a reverse jet cleaning mechanism having an orifice of comparatively small area such that the stream of cleaning gas can be maintained under sufficiently high pressure and therefore issue with a sufficiently high velocity from the orifice that the orifice may be spaced from the filter medium.

Another object of our invention is to devise a reverse jet cleaning mechanism having an orifice of comparatively small area that can be moved in two or more dimensions or directions in order to cover substantially the entire area of the filter medium.

A further object of our invention is to provide a reverse flow cleaning mechanism having a cleaning orifice of comparatively small area so that the cleaning jet may be maintained at a sufficiently high velocity that it penetrates the filter medium and completely dislodges the accumulated solids on the upstream side of the filter medium in an effective manner even where the orifice is spaced from the filter medium.

These and other objects of our invention have been achieved by providing, in combination with a fluid-pervious filter medium through which a stream of fluid passes to remove therefrom suspended particles, orifice-forming means that forms and directs the jet of gas for dislodging the particles which collect on the upstream surface of the filter medium. The orifice-forming means is a hollow member having an orifice the dimensions of which parallel to the filter medium are each a small fraction of the surface dimensions of the filter medium. The orifice-forming means is located in close proximity to the downstream surface of the filter medium with the orifice directed toward the filter medium; and, in a preferred embodiment, comprises an outer tube and an inner tube coaxial with the outer tube and engaging the inner surface of the outer tube sufficiently closely to prevent substantial leakage of the cleaning gas. One of these tubes has a straight slot which extends longitudinally of the tube, and is located at a position opposite to or facing the filter medium. The other of these tubes has a helical slot which crosses over the linear slot to form at the crossing of the two slots an orifice of relatively small total area which extends through the walls of both tubes. Means is provided for introducing into the orifice-forming means a gas, typically air, under pressure sufficient to cause a jet of the gas to issue at a high velocity from the orifice. The jet is directed against the downstream surface of the filter medium and passes through the filter medium to dislodge the particles which have accumulated on the other or upstream side of the filter medium.

In order to cause this small area jet to scan the entire surface of the filter medium, means is provided for causing relative movement of the orifice and filter medium in two directions at an angle to each other. In the illustrated embodiment, this relative movement is accomplished by rotating the tube containing the helical slot with respect to the other tube so that the orifice at the crossing of the two slots travels from one end of the linear slot to the other; and then by moving the two tubes together in a direction transverse to the length of the linear slot, the jet is given a resultant movement in at least two dimensions which causes it to scan or travel over substantially the entire surface of the filter medium. By suitably changing the drive means for moving the two tubes, the jet may be made to scan filter media of different configurations. For example, in one form of our invention, the support and drive means includes a pair of spaced arms carrying the two tubes at their outer ends, the arms being adapted to rotate about the axis of a cylindrical filter medium. On the other hand, the cleaning mechanism may be adapted to a flat surface either by moving the tubes linearly in one direction across the surface or by pivoting them to swing about an axis substantially perpendicular to the surface.

How the above objects and advantages of our invention, as well as others not specifically referred to herein, are attained will be better understood by reference to the following description and to the annexed drawings, in which:

Fig. 2 is a horizontal section on line 2—2 of Fig. 1;

Fig. 3 is a perspective view of the jet-forming means and means for supporting and driving the jet-forming means, removed from the remainder of the filter;

Fig. 4 is a fragmentary vertical section through the upper end of the jet-forming means and upper support arm, as indicated by line 4—4 in Fig. 3;

Fig. 5 is a fragmentary vertical transverse section through the lower end of the jet-forming means and lower support arm, as indicated by line 5—5 in Fig. 3;

Figure 1:
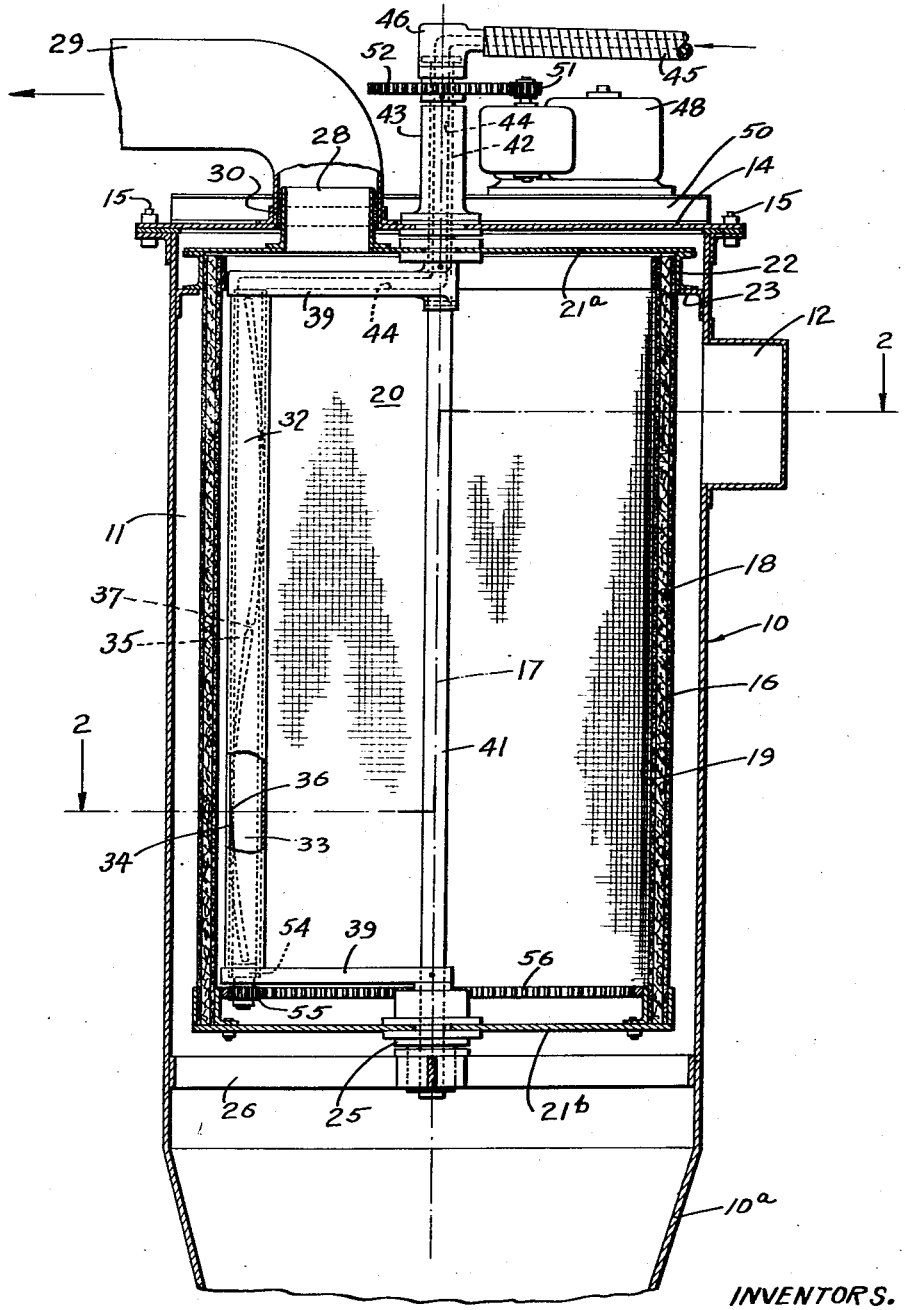
Fig. 1 is a vertical median section through a filter illustrating the application to a cylindrical filter medium of cleaning means embodying a pair of cylindrical tubes adapted to be moved over a circular path.

Referring now to the drawings, there is shown in Figs. 1 to 5 a preferred embodiment of our invention adapted to cooperate with a filter medium of cylindrical shape. The filter herein is adapted to the collection of dry solid particles suspended in a stream of gas, but it will be understood that our invention is independent of the kind of fluid passing through the filter medium or of the type and size of particles suspended in the fluid stream.

There is indicated generally at 10 a cylindrical shell which houses the filter mechanism and defines an internal chamber 11 into which the dust laden gas stream flows through inlet 12. As may be seen in Fig. 1, the lower portion 10a of shell 10 is conical in shape and communicates with a hopper, not shown, adapted to receive and retain dust which is dislodged from the filter medium, as described below. The upper end of shell 10 is closed by removable cover plate 14 which is bolted at 15 to a flange on the upper end of the side walls. Cover plate 14 may be considered to be a part of the shell as it helps define the internal chamber surrounding the filter medium. The joint between the cover plate and the flange on shell 10 is made fluid-tight by means of suitable gasket material.

Inside shell 10 is a cylindrical body 16 of filter material which may be felt, paper, mineral or glass fibers, or any other material suitable for the filtering function to be performed. Generally speaking, the filter medium at 16 is a body of felted or matted fibrous material which is sufficiently porous to pass the fluid carrying the suspended particles but having interstices small enough to catch and retain the particles suspended in the fluid stream. The filter medium is held between a pair of annularly spaced concentric screen members, outer screen 18 and inner screen 19. The space between the two screens is filled by the thickness of filter medium 16.

Screens 18 and 19 are foraminous members with relatively large openings that offer substantially no obstruction to the free flow of fluid through the filter medium 16. The purpose of screens 18 and 19 is to shape and to support the filter medium which is inherently easily deformable and requires a reinforcing or supporting structure in order to hold it in a given shape or position. The filter medium is not only supported against the pressure differential across it but it is shaped to a cylindrical configuration about vertical axis 17 with the filter medium annularly spaced from the side walls of shell 10. The inner screen is interposed between the downstream side of the filter medium and the orifice-forming means described later to position the filter medium relative to the path of the orifice as it scans the downstream surface. Typically, screens 18 and 19 may be made of woven wire cloth and they are comparatively thin relative to the thickness of the filter medium, the thickness of the screens being exaggerated in the drawings for purpose of illustration. Since the screens perform no filtering function the collected dust is considered to deposit directly on the filter medium as if there were no screen.

The space within the cylindrical filter medium is a subchamber 20 contained entirely within but separated from chamber 11; and this subchamber is closed at its top and bottom ends by plates 21a and 21b respectively. Top plate 21a rests upon circular channel 22 which in turn is supported by angle bracket 23 on the inside of shell 10.

Screens 18 and 19 are fastened to channel 22 to support the filter medium in place. Bottom plate 21b is attached to outer screen 18 in a suitable manner to prevent escape of gas between the filter medium and the plate, but the plate is supported centrally on stationary hub 25 which in turn rests upon spider 26 the outer ends of which are attached to shell 10.

The dust laden gas stream enters housing 10 through inlet duct 12 which directs the incoming stream into space 11 in a direction generally tangential of the housing. The gas stream reaches all the exterior or upstream surface of filter medium 16 by flowing through the annular space between the filter medium and the walls of shell 10. The gas stream then flows radially inwardly through the filter medium, the suspended particles of solids or dust being deposited upon the upstream side of the filter medium. The cleaned gas thus reaches subchamber 20 defined by the filter medium and top and bottom plates 21a and 21b, from which space the clean gas leaves by way of short sleeve 28 which telescopes into the lower end of outlet pipe 29. Outlet pipe 29 is fastened to cover plate 14. Any space between sleeve 28 and pipe 29 may be filled with a gasket or the like as indicated at 30 in order to provide a gas-tight seal between these two members and prevent the escape of any dust laden gas from the interior of shell 10 directly into the outlet pipe.

The means for cleaning the filter medium by reverse movement of air or gas through it is the scanning jet assembly which is shown in detail in Figs. 3, 4 and 5. This assembly includes orifice-forming means that comprises an outer cylindrical tube 32 and an inner cylindrical tube 33. The two tubes are coaxial and of the same length. The inner tube engages the inner surface of the outer tube in order to prevent leakage of cleaning air between the tubes; but at the same time the tubes fit together loosely enough that one tube, preferably as here the inner tube, can be rotated freely with respect to the outer tube.

Outer tube 32 is provided with a narrow linear slot 34 which extends longitudinally of the outer tube for substantially the full length thereof. Since the position of this linear slot determines the direction of the cleaning gas jet, this slot is located on the side of tube 32 which is closest to or facing the filter medium. Also for this reason, tube 32 is stationary. Inner tube 33 has a helical slot 35 which is preferably of such inclination that it makes one complete revolution around the tube in the full length of slot 34. The two slots overlap or are superposed at some position 36 along the linear slot and where the two slots cross they form an orifice of comparatively small area which extends completely through the walls of the two tubes and allows air under pressure inside tube 33 to pass outwardly in a jet of relatively small cross sectional area.

One or both of slots 34 and 35 may be interrupted by a relatively narrow bridge or web 37 of metal to reinforce the tube and render it more stable dimensionally. In Fig. 1 such a web is shown as an integral part of tube 33; but the web may be any other suitable construction. The entire extent of the helical slot is referred to as being but a single slot, even though interrupted at longer or shorter intervals by a web 37, since each web is so narrow that the slot functions substantially as a single continuous slot.

The ends of tubes 32 and 33 are inserted into sockets located near the outer ends of two arms 39 spaced apart along axis 17, as may be seen in Figs. 1, 4 and 5. Lower arm 39 is connected at its inner end to vertical shaft 41 which is rotatably mounted in stationary hub 25 and in spider 26 which supports the shaft with its axis coincident with axis 17. Upper arm 39 is also connected at its inner end to shaft 41, as well as to vertically extending shaft 42 which is rotatably mounted in sleeve bearing 43 mounted on cover plate 14. Bearing 43 mounts shaft 42 with its axis coincident with axis 17 and hence with the axis of shaft 41. The two arms 39 and shafts 41 and 42 are held against relative rotation at their various joints by suitable means such as pins 43a.

The upper shaft 42 and arm 39 are preferably hollow to provide an air passage 44, as shown in Fig. 4, which connects with the upper end of the inner tube 33. By this means, air under pressure is introduced into the interior of tube 33. This air is supplied from any suitable source (not shown) and is brought to the filter through hose 45 or other conduit which is connected by swivel coupling 46 to the upper end of hollow shaft 42, as indicated in Fig. 1. If desired, air may be supplied through lower arm 39 and the lower end of shaft 41 instead. Air is mentioned as a gas for cleaning the filter medium since it is suitable for most purposes and readily available, but the invention is not limited thereto. Other gases may be used if it is not desired to introduce air into the system. In some cases dry steam may be used to advantage where a gas at high temperature is desired.

Since shafts 41 and 42 are aligned with each other and are both coaxial with filter medium 16, rotation of the shafts causes the two radial arms 39 to rotate about vertical axis 17 and the assembly of tubes 32 and 33 is moved over a circular path which is concentric with the cylindrical filter medium. This movement in a circular path carries the jet-forming means entirely across the downstream surface of the filter medium at each revolution of arms 39. The drive means for rotating these radial arms consists of gearhead motor 48 which may be of any conventional style suitable for the purpose. Motor 48 is here shown as being mounted upon transverse beam 50 which is on top of cover plate 14 and supported by the walls of shell 10; but the motor may be supported in any other way that may be desired. The output shaft of the motor is provided with a drive pinion 51 which meshes with gear 52 attached to shaft 42 above the bearing sleeve 43. Pinion 51 upon being rotated by the motor, turns gear 52 and shaft 42 and thus moves the two cylindrical tubes 32 and 33 as a unit relative to the filter medium.

In order to shift the position of orifice 36 in tubes 32 and 33, the tube containing the helical slot is rotated relative to the other tube. Although this rotation may be accomplished by other means than here shown, it may very conveniently be done by attaching to the lower end of inner tube 33 a short shaft 54 extending below the tubes and arm 39 and upon which is mounted pinion 55. Pinion 55 meshes with stationary ring gear 56, as shown particularly in Fig. 1. Ring gear 56 is concentric with the filter medium and with the circular path of the cleaning means. Consequently, as arms 39 revolve about the axis 17 pinion 55 is caused to revolve about its own axis by virtue of its meshing engagement with ring gear 56 and this motion of pinion 55 revolves tube 33. Pinion 55 is preferably made of very small diameter relative to ring gear 56 in order to rotate inner tube 33 a number of times for each complete revolution of the cleaning means around the axis of filter medium 16. The same result can be had by other suitable arrangements, as for example a fixed gear mounted on hub 25 and meshing with pinion 55.

Assuming that arms 39 rotate continuously about axis 17, the inner tube 33 also rotates continuously with the drive means shown; but the invention is not limited to continuous rotation of the tube.

In operation, the stream of gas carrying solid particles in suspension enters through inlet 12 and fills space 11 within shell 10 and around filter medium 16. The gas stream passes through the filter medium and the suspended particles are deposited on the outer or upstream surface of the filter medium. The clean gas leaves space 20 inside the filter medium through sleeve 28 and outlet pipe 29. This flow of the main gas stream need not be interrupted at any time in order to clean the filter medium of accumulated solids on the upstream face thereof. This is true whether the cleaning means is operated either intermittently or continuously, under manual or automatic control.

For cleaning the filter medium, air or other suitable gas under high pressure is introduced through hose 45 and shaft 42 into pasage 44 in upper arm 39 and thence into tube 33. At the overlap of slots 34 and 35 there is formed an orifice 36 which extends through both tubes from the interior of tube 33 to the outside; and through this orifice passes a jet of cleaning air under pressure that is directed against the downstream surface of the filter medium. This jet of cleaning air passes through the filter medium because of its relatively high velocity and dislodges the accumulated solid particles on the upstream side of the filter medium. This jet moves in a direction reverse to the main flow of gas because it locally establishes a pressure differential of such magnitude and direction that the net drop in pressure over a small area is toward the outside of the filter medium.

By rotating tube 33 orifice 36 travels for the full length of slot 34; and the vertical length of slot 34 corresponds closely, if not exactly, to the vertical or axial dimension of the filter medium which is available for filtering purposes. The slope of slot 35 and the direction of rotation of inner tube 33 are so correlated that the jet orifice starts at the top of the tube and moves downwardly of slot 34. This downward movement of the orifice is repeated for each revolution of tube 33; and it will be noted that there is no return or upward movement of the orifice. Orifice 36 preferably traverses the full length of slot 34 once for each single revolution of the inner tube; but it will be understood that it is within the scope of my invention to alter the range of travel of the orifice for each revolution of the tube by changing the slope of helical slot 35 so that it extends over more or less than one complete turn about the axis of tube 32 within the length of slot 34. For example, two similar slots diametrically opposed to each other and each extending for 180° around the tube axis would make orifice 36 traverse slot 34 for each half turn of the inner tube. In effect two orifices 36 are now created, one as each of the two helical slots crosses the fixed linear slot. One advantage is that the jet moves vertically twice as fast for a given speed of revolution of the inner tube, as one helical slot after the other crosses the linear slot. Or the slope of slot 35 may be reduced so that it makes a plurality of turns about the tube, within the length of tube used.

It is preferred that orifice 36 moves downwardly as this facilitates dislodging the accumulated dust particles on the outside of the filter medium. As the orifice starts on this downward movement, a part of the dust dislodged falls clear of the filter medium and into the lower portion 10a of the shell. However, at least a part of the dislodged particles are redeposited upon the filter medium at a point below the position that they occupied when first dislodged. By moving the jet downwardly along the filter medium, the redeposited particles are again dislodged, perhaps one or several times, but the jet in effect follows them down the filter medium and eventually dislodges them from a position close to the bottom of the filter medium from which they fall clear and are not redeposited.

The jet-forming means consisting of tubes 32 and 33 is here shown as being close to but slightly spaced from the downstream surface of filter medium 16. This is made possible by the fact that the jet issuing from orifice 36 is of relatively small cross sectional area and therefore a sufficiently high pressure can be maintained inside tube 33 to give the necessary velocity to the jet of cleaning gas as it leaves the tubes to reach and pass through the filter medium. The space between the tubes and the filter medium may be generally of the order of ⅛ to ½ inch, or more or less, as may be desired. The advantage of this spacing is the fact that no wear or deterioration of the filter medium results from engagement with the cleaning means as it traverses the face of the filter medium. On the other hand, if the filter medium be of such character that it withstands the wear and breakup of the fibers caused by rubbing against the cleaning means, then the tubes may be moved closer, even to a position in which tube 32 is in engagement with the filter medium.

The path traced by the jet during each vertical traverse of linear slot 34 is the resultant of two motions, its vertical movement along the slot and the horizontal movement of slot 34 produced by the angular movement of arms 39 during one such vertical traverse. This path is a sloping line. At each revolution of the inner tube a similar path is traced upon the downstream surface of the filter medium, parallel to and spaced from the immediately preceding path of the cleaning jet in the direction of rotation of arms 39. In order to cover the entire surface of the filter medium, it is desirable that each succeeding revolution of arms 39 bring the paths traced by the jet somewhere between paths traced during the preceding revolution. After a number of revolutions about the central axis, depending on the width of the jet, the spacing between successive paths, and other factors, the entire inner surface of the filter medium is covered by the jet which eventually traces a number of paths that are preferably slightly overlapping. For this reason it is preferable to design gear 56 with a prime number of teeth to provide what is commonly known as a "hunting" tooth. This prevents the cleaning jet from retracing exactly the same paths for each revolution of arms 39 about axis 17.

It is preferable to have the outer one of the two tubes of the cleaning means stationary in order to eliminate a rapidly moving part in close proximity to the filter medium. However, it is within the scope of my invention to place the tube with the spiral slot outside the stationary tube and use the stationary tube with the linear slot as an internal bearing upon which the other tube rotates.

Figure 6:
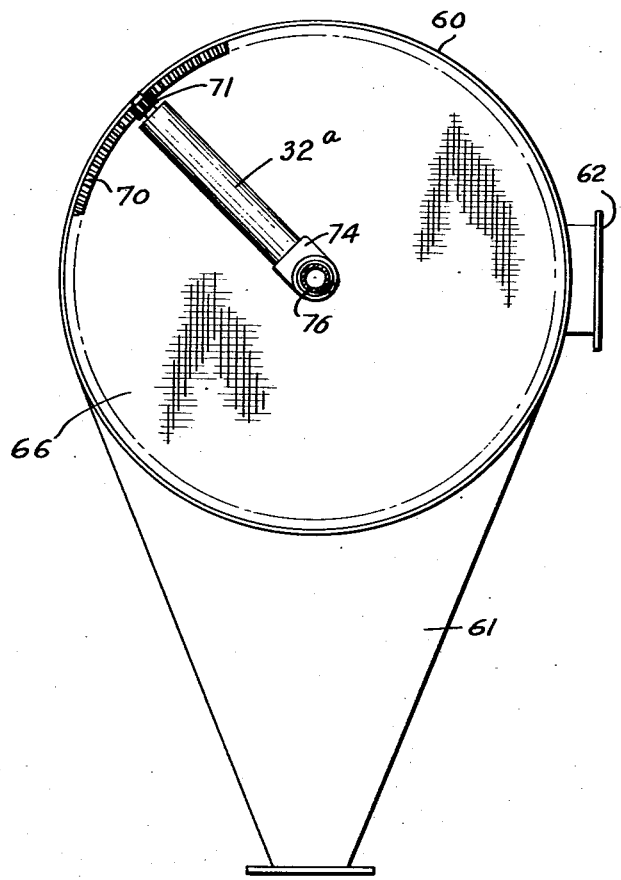
Fig. 6 is a side elevation of a filter having a flat filter medium illustrating the application thereto of a variational form of our invention.
Figure 7:
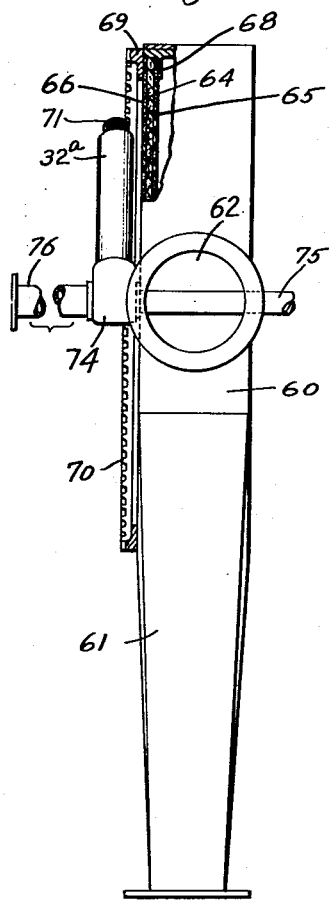
Fig. 7 is a side elevation of the filter of Fig. 6.

There is illustrated in Figs. 6 and 7 a modified form of my invention in which the filter medium is in the shape of a flat circular disc so that the downstream face is flat. Consequently, the jet-forming means is mounted in such a manner that the jet can scan a plane surface.

In Figs. 6 and 7 the filter shell 60 is drum-like in shape and opens at its lower side to a tapering hopper 61 which collects dislodged solid particles and discharges them at its lower end to suitable storage or conveying apparatus, not shown. The inlet for dust laden gas is at 62 and permits introduction of the gas stream into the interior of shell 60.

Shell 60 is impervious to fluid. At least one side has an opening which is closed by a disc-like body of filter medium 64 which is confined and supported between two spaced flat screen members 65 and 66, in the same general manner as previously described. The body of filter medium and the screen at either side of it are held around their periphery between a pair of angular flanges 68 and 69 which are fastened to shell 60 in any suitable manner. In this way a gas-tight connection is made between the filter medium and the shell so that gas entering the shell can leave only by passing outwardly through the layer of filter medium 64. The outer or downstream side of the filter medium is exposed to the atmosphere and the clean gas is discharged directly to the atmosphere.

One leg of angle flange 69 may conveniently be formed as a circular rack 70 which extends completely around the margin of the filter medium. Meshing with circular rack 70 is pinion 71 which is rotated about its own axis as it rolls over the stationary rack. Pinion 71 is attached to a short shaft extending outwardly from one end of the inner rotatable cylindrical tube of the jet-forming means for cleaning filter medium 64. This jet-forming means consists of two cylindrical tubes, the inner one of which (not shown) is rotatable and the outer one 32a is stationary, the construction and arrangement of these two tubes being as previously described. Though not shown in Figs. 6 or 7 the inner tube and the outer tube are provided respectively with a helical slot 35 and a linear slot 34 producing a jet orifice at their crossing. At the end removed from pinion 71, the two cylindrical tubes are mounted in base member 74 which, with pinion 71, supports these tubes at the desired distance from the downstream surface of filter medium 64. Base 74 is hollow and mounted on shaft 75 which extends through and is rotatable relative to shell 60.

Cleaning gas is introduced under pressure by pipe 76 into base 74 and from thence into the interior of the inner tube of the scanning jet assembly.

Shaft 75 projects outwardly beyond the side of the filter in order to permit connection of the shaft with a suitable prime mover (not shown), such as an electric motor, by which the shaft is rotated in order to cause the jet-forming tubes to move pivotally about the axis of shaft 75.

For the sake of simplicity of disclosure, a body of filter medium 64 is shown at only one side of housing 60; but it will be understood that the housing may have similar openings at both sides, each closed by a disc-like body of filter medium held between two screens as described. A second jet-forming means is then added, the necessary structural changes being obvious.

It will be noted that the axis of shaft 75 is perpendicular to the plane of the downstream surface of the filter medium. By pivotally moving the jet means about such an axis, the jet tubes sweep over the entire surface of the filter medium. Rotation of the tubes relative to each other causes the jet formed at the crossing of the two slots to move along a radius of the downstream surface of the filter medium, and swinging movement of the two tubes about the axis of shaft 75 advances the locations of successive paths of the air jet in order to cover the entire surface of the filter medium, as will be understood from the earlier description. At any instant during rotation of shaft 75 the movement of the two tubes about shaft 75 is movement substantially perpendicular to the length of the tubes and the linear slot in the outer tube. The combined motions of the orifice and tubes results in a two-dimensional movement of the jet that eventually scans the entire surface of the filter medium, or substantially so.

Figure 8:
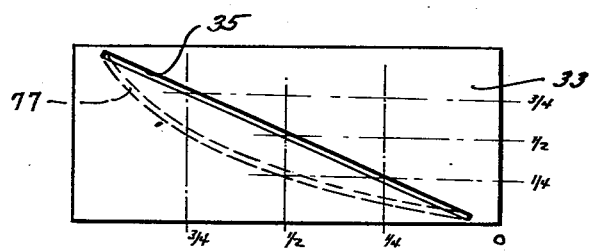
Fig. 8 is a plan of the inner tube of the jet-forming means developed to show a variational slot formation.

In Fig. 3 helical slot 35 has a uniform slope. If the inner tube 33 is developed on a plane, as in Fig. 8, slot 35 is then a straight slot inclined uniformly to the longitudinal axis of the tube. With such a slot and a uniform rotational speed of tube 33 about its longitudinal axis, jet orifice 36 moves along the linear slot at a uniform rate. Under some conditions a non-uniform rate of movement may be desired. An example is the filter construction of Figs. 6 and 7 in which it may be desired to decrease the radial component of jet movement as the jet moves outwardly away from the axis of shaft 75. This decrease is to compensate for the greater rate of absolute movement of the jet over the filter surface to be cleaned resulting from the increasing length of arcuate movement of the jet per unit time as the jet recedes from the axis of shaft 75. A non-uniform rate of jet travel can be obtained by giving to helical slot 35 some non-uniform slope, as, for example, the curved shape indicated by the dotted line 77 in Fig. 8. In Fig. 8 the vertical dot-dash lines represent the quarter points in distance traveled by the jet orifice along linear slot 34, and the horizontal dot-dash lines are the quarter-points in one revolution of inner tube 33 about its longitudinal axis. Assuming the right hand end of slot 77 in Fig. 8 is closest to the axis of shaft 75, the jet orifice now moves more rapidly than before (about twice as fast) over the first half of its travel radially away from the axis of shaft 75. Only one-fourth a revolution or about half as much rotation of tube 33 about its longitudinal axis is now required to move the orifice midway to the circumference of the filter, because of the lesser slope of slot 77. Accordingly three-fourths of one revolution remains for the jet formed by slot 77 to move over the second half of its travel to the rim of the filter.

During the last fourth of the distance traveled by the jet, the greater slope of slot 77 relative to the linear slot causes the jet to travel radially much more slowly than before. This will suggest how various other shapes may be given to slot 35 to obtain changes in the rate of movement of the orifice or its path over the filter body.

Having described certain embodiments of our invention, it will be apparent that various changes and modifications in the construction and arrangement of the several parts may be made without departing from the spirit and scope of our invention. Several modifications within the spirit of the invention have already been suggested in the foregoing description. Consequently, it is to be understood that the foregoing description is considered as being illustrative of, rather than restrictive upon, the appended claim.

We claim:

In a filter for removing suspended particles from a fluid stream, the combination comprising: a fluid-pervious filter medium through which a stream of fluid carrying suspended particles is passed to remove suspended particles whereby particles collect on the upstream surface of the filter medium, said filter medium having flat upstream and downstream surfaces; an orifice-forming means pivotally mounted to swing about an axis perpendicular to the downstream surface of said filter medium and comprising an outer tube located in close proximity to the downstream surface of the filter medium, and an inner tube coaxial with and inside the outer tube, the axes of said tubes extending parallel with the downstream surface of said filter medium, one of said tubes having a linear slot extending longitudinally of said tube at a position facing the filter medium and the other of said tubes having a curved slot which has a progressively smaller radius of curvature as it extends away from said perpendicular axis, said curved slot crossing the linear slot to form at the crossing an orifice extending through both tubes, the dimensions of said orifice each being a very small fraction of the surface dimensions of said filter medium; means for introducing gas into the inner of said two tubes under pressure sufficient to cause a jet of cleaning gas to issue from said orifice against an area of the downstream surface of said filter medium substantially commensurate with the dimensions of said orifice and to pass through the filter medium to dislodge particles on the upstream surface thereof; means for swinging said orifice-forming means about said axis which is perpendicular to the downstream surface of said filter medium whereby progressively to bring said orifice-forming means into close proximity with an extensive area of said downstream surface; means for rotating the tube having the curved slot about its longitudinal axis when said orifice-forming means is swung about said perpendicular axis, said rotation of said tube having the curved slot being relative to the tube forming the linear slot to shift the orifice along the linear slot and thus progressively to position said orifice in uniformly close proximity to all increments of the area of said downstream surface of said filter medium over which said orifice-forming means is moved.

References Cited in the file of this patent

UNITED STATES PATENTS

| 996,860 | Kestner | July 4, 1911 |
| 1,191,483 | Thomas | July 18, 1916 |
| 1,498,061 | Adams | June 17, 1924 |
| 1,877,157 | Cannon | Sept. 13, 1932 |
| 2,026,834 | Holly | Jan. 7, 1936 |
| 2,534,171 | Kirby | Dec. 12, 1950 |
| 2,559,428 | Hersey | July 3, 1951 |
| 2,591,198 | Ringe | Apr. 1, 1952 |
| 2,678,109 | Vedder | May 11, 1954 |
| 2,695,002 | Miller | Nov. 23, 1954 |

FOREIGN PATENTS

| 1,155 | Great Britain | Jan. 16, 1906 |